United States Patent [19]

Foreman et al.

[11] Patent Number: 5,072,368

[45] Date of Patent: Dec. 10, 1991

[54] IMMEDIATE DUPLICATION OF I/O REQUESTS ON A RECORD BY RECORD BASIS BY A COMPUTER OPERATING SYSTEM

[76] Inventors: Dennis J. Foreman, 4605 Marshall Dr. W., Binghamton, N.Y. 13903; Lawrence E. Larson, Box 317, Mountainview Rd., Rte. 4, Peekskill, N.Y. 10566

[21] Appl. No.: 571,836

[22] Filed: Aug. 24, 1990

Related U.S. Application Data

[63] Continuation of Ser. No. 390,466, Aug. 2, 1989, abandoned, which is a continuation of Ser. No. 793,406, Oct. 31, 1985, abandoned.

[51] Int. Cl.⁵ ............... G06F 12/16; G06F 13/00
[52] U.S. Cl. ............... 395/575; 364/268; 364/268.5; 364/26.5; 364/285; 364/280; 364/DIG. 1
[58] Field of Search ............... 364/200, 900

[56] References Cited

U.S. PATENT DOCUMENTS

| | | | |
|---|---|---|---|
| 3,623,014 | 11/1971 | Doelz et al. | 371/10 X |
| 3,668,644 | 6/1972 | Looschen | 364/200 |
| 3,866,182 | 2/1975 | Yamada et al. | 364/200 |
| 3,882,455 | 5/1975 | Heck et al. | 364/200 |
| 3,889,237 | 6/1975 | Alferness et al. | 364/200 |
| 3,984,814 | 10/1976 | Bailey, Jr. et al. | 364/200 |
| 4,250,106 | 6/1988 | Aiken, Jr. | 364/200 |
| 4,394,728 | 7/1983 | Comfort et al. | 364/200 |
| 4,404,647 | 9/1983 | Jones et al. | 364/900 |
| 4,525,839 | 6/1985 | Nozawa et al. | 371/38 X |
| 4,543,626 | 9/1985 | Bean et al. | 364/200 |
| 4,611,314 | 9/1986 | Ogata et al. | 369/32 X |

OTHER PUBLICATIONS

IBM Technical Disclosure Bulletin, vol. 26, No. 11, pp. 5792-5793, Apr. 1984.

*Primary Examiner*—Gareth D. Shaw
*Assistant Examiner*—Paul Kulik

[57] ABSTRACT

A method for ensuring data integrity in a computer system having a primary logical device and one or more alternate logical devices. These logical devices have substantially identical data stored in them and have the capability of responding to requests. The system duplicates device access to the alternate logical devices. The logical devices are identified to the computer system as the devices on which duplicating or mirroring operations are to be performed. A read operation or a write operation is performed on the primary logical device. In the case of a write operation, it is also performed simultaneously on the alternate logical devices. The system waits for a response from the primary logical device. If the response indicates that the primary logical device has failed, the alternate logical devices are relied on to complete the operation.

14 Claims, 5 Drawing Sheets

IMMEDIATE DUPLICATION OF I/O REQUESTS ON A RECORD BY RECORD BASIS BY A COMPUTER OPERATING SYSTEM

CROSS-REFERENCE TO RELATED APPLICATIONS

This application is a continuation of application Ser. No. 07/390,466 filed Aug. 2, 1989, abandoned, which in turn was a continuation of application Ser. No. 06/793,406 filed Oct. 31, 1985, abandoned.

BACKGROUND OF THE INVENTION

In the field of electronic data processing, it has become apparent over the years that errors are wont to occur both in hardware and in software. Such errors can be disastrous if not detected, corrected or accounted for in a timely manner. Many systems have been invented for preventing errors, but none of them is foolproof.

In general, after an error has been detected, one of two basic approaches can be implemented: correct the data where it resides or copy a correct version of the data from elsewhere. Systems for copying data in light of impending errors have been known for some time in the computer field. For example, U.S. Pat. No. 3,866,182 issued to H. Yamada et al discloses a system for transferring information between memory banks upon detection of an error in one of the memory banks. Here, one of the memory banks serves as an operating device while another one serves as a standby device. After an error occurs, data that is preserved in the standby device can be reloaded into the operating memory. A separate memory-to-memory transfer circuit is required. It appears that the first active memory cannot be used while the standby memory is being accessed.

It is difficult to predict and impossible to prevent error generation. The best that can be done is to handle erroneous information in such a way so as not to affect the general operation of a computer system. To that end, systems have been developed to treat errors separately. In the field of hardware error handling, systems have been devised to deal only with correct data, not the errors embedded therein.

For example, U.S. Pat. No. 4,394,728 issued to J. A. Comfort et al discloses a hardware system for accessing multiple common resources. This represents an access control system for allowing two or more devices to access a common resource (e.g., a memory device in the Comfort patent). This reference is relevant to the discussion of error handling because it incorporates a concept of secondary memories which are used as ready-standby devices in the event of data transfer faults or system failure. Each secondary memory device is operatively connected to a principal device and is called into action when the principal device fails. The aforementioned reference deals with memory in a hardware system.

U.S. Pat. No. 3,882,455 issued to D. A. Heck et al teaches a digital communication system having a facility for duplicating data residing in a central processor, instruction storage, process storage and peripheral controllers. This facility is a hardware system operating under direction of a fault recovery program to handle malfunctions in one part of a storage area by making a copy of the original in another storage area. The storage areas contain data in a plurality of peripheral control units and the duplication process is handled on a unit by unit basis. Each peripheral control unit is designated as either active or standby. When a complete set of units in a complex, sometimes known as a physical device, can be placed in service, the fault recovery program does so. Anything less than a complete set of units, however, cannot be installed in a system.

The aforementioned hardware system is used in switching networks and requires a significant amount of specialized hardware for its operation.

In the past it has been difficult to guarantee data integrity in computer systems due to errors that may occur as a result of hardware or software failures.

In particular, problems associated with hardware or software failures that occur either when data is written (i.e., stored) or when previously written data is read at a later time (i.e., retrieved) have simply not been solved by hardware error handling systems. The general problem of protecting data during read and/or write operations has not been adequately addressed.

In hardware systems, error handling has tended to be expensive and relatively inflexible. For example, hardware systems often require that the data residing on an entire physical device be preserved by means of copying. Moreover, a direct correspondence between the original or source data and the copied or target data must be available in hardware error handling systems.

It would be advantageous to provide a facility for copying data (i.e., mirroring) on a logical device basis, rather than on a physical device basis.

Further, it would be advantageous for the mirroring operation to be controllable by a general user at will. That is, there should be no requirement for a user to be privileged or for some extraneous automatic hardware or software process to use an error handling system, nor should a general user require assistance from a privileged user.

It would further be advantageous to provide a system of error handling that does not require dedicated duplicate devices with special hardware associated therewith.

Moreover, it would be advantageous to be able to duplicate data simultaneously from one logical device to another in real time, instruction by instruction.

It would also be advantageous to perform a read operation singly from a logical device unless a data failure is detected and, in that case, to perform another read operation on another logical device. That is, a second read operation should be required only when a first read operation is unsuccessful. It would also be advantageous to provide a system of error handling that would operate successfully either synchronously or asynchronously.

It would further be advantageous to provide for continuous operation even upon failure of one or more logical devices.

SUMMARY OF THE INVENTION

In accordance with the present invention, there is provided a method for ensuring data integrity in a computer system having a primary logical device and one or more alternate logical devices. These logical devices have substantially identical data stored in them and have the capability of responding to requests. The system duplicates device access to the alternate logical devices. The logical devices are identified to the computer system as the devices on which duplicating or mirroring operations are to be performed. A read operation or a write operation is performed on the primary logical device. In the case of a write operation, it is also performed simultaneously on the alternate logical devices. The system waits for a response from the primary logical device. If the response indicates that the primary logical device has failed, the alternate logical devices are relied on to complete the operation.

BRIEF DESCRIPTION OF THE DRAWINGS

A complete understanding of the present invention may be obtained by reference to the accompanying drawings, when taken in conjunction with the detailed description thereof and in which:

FIG. 4, comprising FIGS. 4A and 4B, is a flow chart showing system operation in accordance with the present invention.

DETAILED DESCRIPTION OF THE PREFERRED EMBODIMENT

Figure 1:
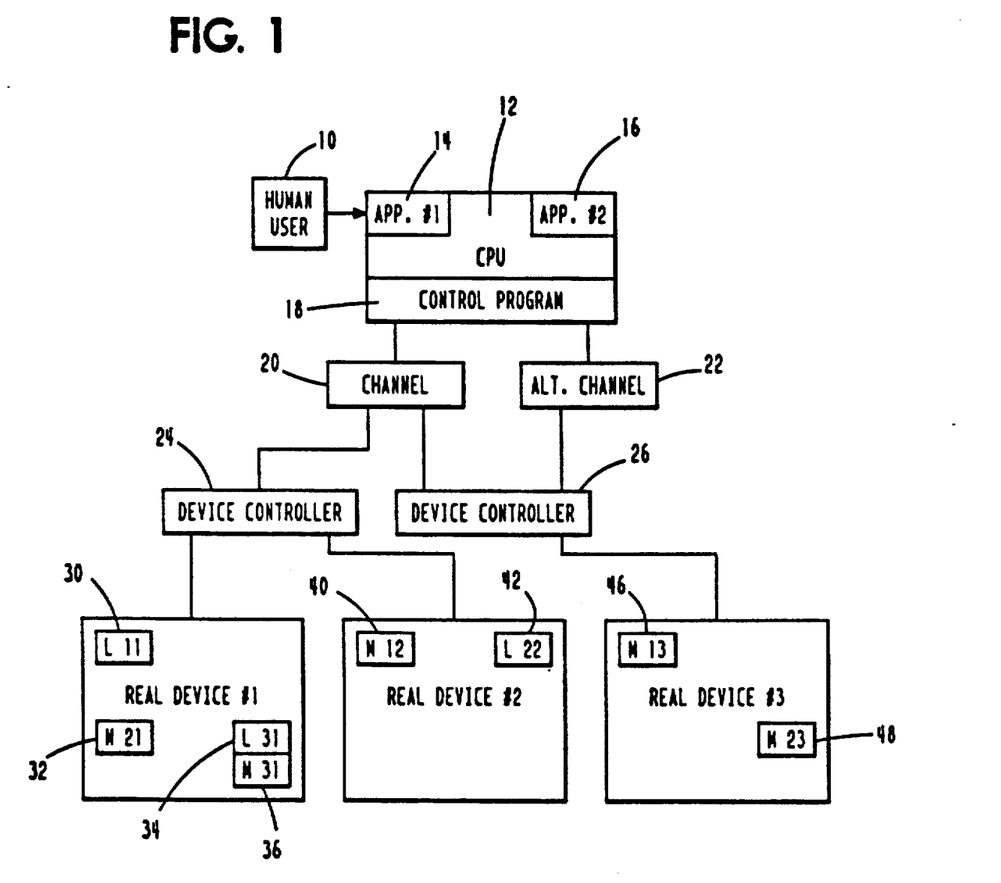
FIG. 1 is a block diagram that forms the environment for the mirroring system in accordance with the present invention.

Referring now to FIG. 1, there is shown a block diagram of the preferred environment in which the present invention is intended to operate.

A human user 10 has access to a central processing unit (CPU) 12 such as is manufactured by the present assignee as a Model Number 3081 processor. It should be understood, however, that the present invention is suitable for use in any other computing system provided that such a system is adapted to operate with so called logical devices. A logical device is a mapped location that resides on a physical device (e.g., a magnetic disk) and can be accessed as if it were a separate physical device independent of other such logical devices mapped into the same physical device. Details regarding logical devices and mapping to physical devices can be found in the IBM Corp. publications, "Virtual Machine/System Product Introduction", "Virtual Machine/System Product CMS User's Guide", and "Virtual Machine/System Product System Programmer's Guide" and in the description of the IBM VM/System Product, program number 5664-167.

It should be understood that the user 10 need not be a human user. In fact, the present invention can be invoked automatically by previously loaded instructions residing in the memory of the CPU 12. Such instructions are identified generally by reference numerals 14 and 16 in FIG. 1. Similarly, two or more users, not shown, can access the information in the CPU 12 simultaneously, as long as security requirements are met and the CPU 12 has the capability of supporting multiple users.

Loaded in the memory of the CPU 12 is a control program known as an operating system 18. In the preferred embodiment, the operating system 18 is the aforementioned VM/System Product program.

Connected to the CPU 12 is a channel 20. It should be understood that depending on the model number of the CPU 12, such a channel 20 may be part of the CPU 12, not a separate device as shown. More than one channel can also be connected to a CPU 12. For example an alternate channel 22 can also be connected to the CPU 12.

Connected to the channel 20 is a device controller 24 such as supplied manufactured by IBM Corporation as a Model Number 3830 controller. A device controller 24 is capable of supporting one or more identical peripheral devices.

As shown in FIG. 1, another device controller 26 can also be connected to the same channel 20 or to an alternate channel 22, depending upon the configuration requirements of the users. It should also be understood that one device controller 26 can be connected to two or more channels 20, 22 facilitating a technique called multiple pathing. When one channel 20 is overloaded or working at capacity, a multiple pathing configuration allows the alternate channel 22 to be used to transfer data from and to the CPU 12 by means of the device controller 26.

The device controller 24 has connected to it a physical device #1 which, in the preferred embodiment, is a direct access storage device (DASD), which is connectable to one or more peripheral devices (not shown), such as a magnetic disk drive, a magnetic tape drive, a printer or the like. Physical devices are also known as real devices.

DASD devices can be subdivided into logical portions as hereinabove mentioned, called logical devices. One or more logical devices can exist on one real device. In FIG. 1, for example, logical devices 30, 32, 34 and 36 are resident in real device #1 at one instant of time. These logical devices 30-36 can be erased, modified or moved at the user's discretion.

The labelling convention used herein is a letter and two digits. An L indicates a primary logical device; an M indicates a mirroring logical device; the first digit indicates the logical device number; and the second digit indicates the real device containing the logical device. Logical device 30 is named L11 signifying that the device is logical (L), is the first logical device in the system (1) and resides on real device #1 (1).

Similarly, logical device M21 32 is a mirror device (M), is the second logical device in the system (2) and also resides on real device #1 (1).

Also connected to device controller 24 is real device #2, which in this embodiment contains logical devices 40 and 42, as shown. Connected to the other device controller 26 is real device #3 which, in turn, includes logical devices 46 and 48.

It should be understood that the disclosed configuration of the system need not be slavishly copied to practice the present invention. Indeed, this particular configuration is independent of the understanding of the invention. For example, any number of device controllers, channels and/or real devices can be properly used, if desired, during the operation of the present invention. Moreover, the CPU 12 itself need not be the only CPU in a network that will allow the present invention to operate.

Mirroring, also variously known as duplicating or cloning, is actually a writing or reading operation that transfers information to or from two or more logical devices simultaneously. This dual writing or reading operation is not a copying operation. Two original versions of the same data are created simultaneously.

Data that is in one logical device 34 can also be written onto a second, mirroring device 36 for example. In this case, real device #1 has two portions set aside in which logical devices 34 and 36 contain the same information. A control program statement such as:

MIRROR L31 M31 would specify the two logical devices 34, 36 respectively. Data residing on primary device L31 34 would be copied onto device M31 36 as a result of the aforementioned statement execution.

It should be understood, however, that logical devices residing in two or more real devices #1, #2 and #3 can be used either as mirroring devices or as the principal or primary logical device. For example, a primary logical device 30, located in real device #1, can have its corresponding mirror logical device 40 residing in real device #2. Moreover, the same primary logical device 30 can have data stored therein which is also stored in corresponding mirror logical device 46, residing in real device #3. Similarly, a primary logical device residing in either of the other real devices #2 and #3 can have a corresponding mirror logical device in any of the real devices #1, #2 or #3. The mechanism by which such mirroring is accomplished in accordance with the present invention is hereinbelow described.

Figure 2:
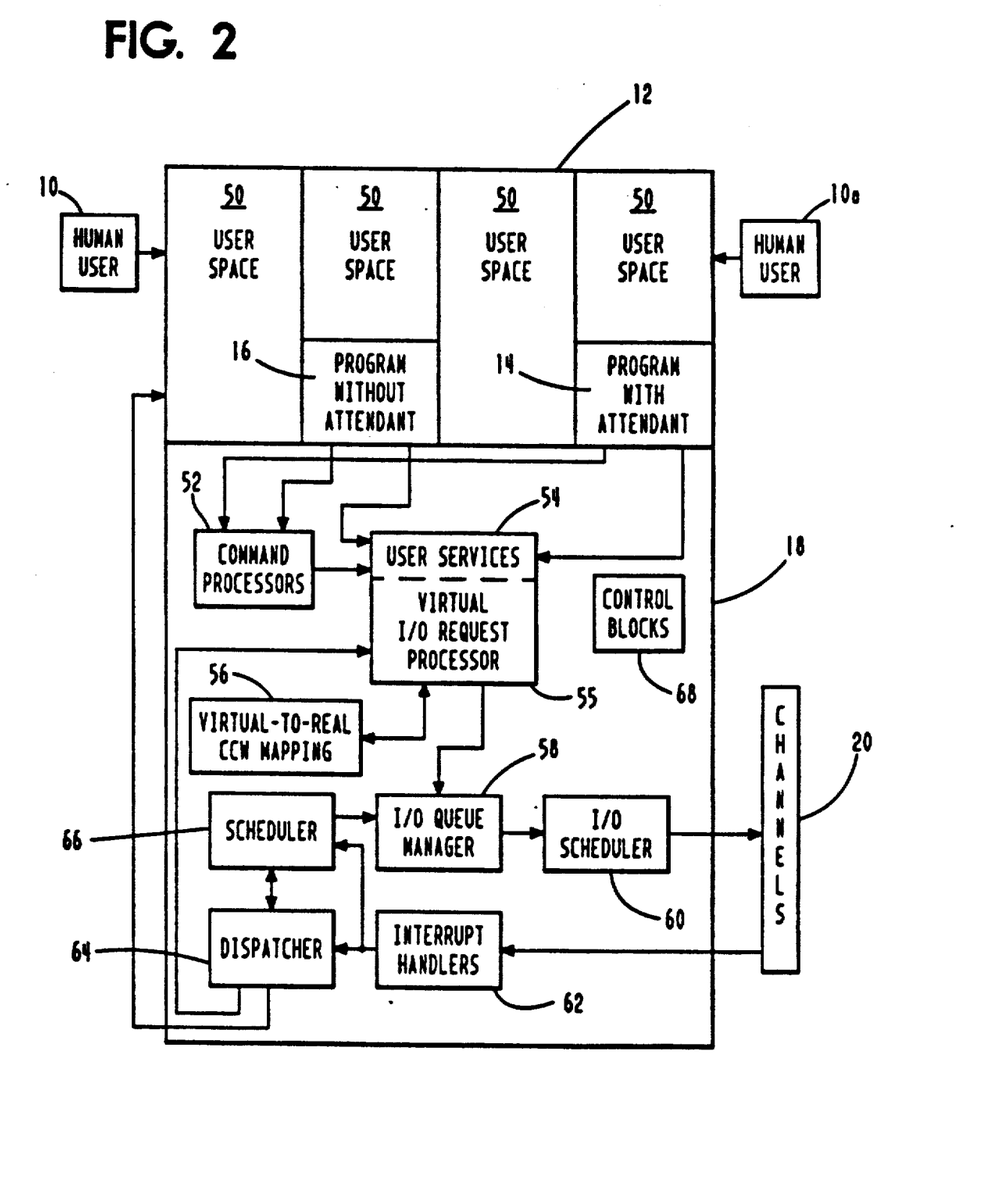
FIG. 2 is a block diagram of the internal structure of a CPU.

Referring now also to FIG. 2, there is shown a block diagram of the internal structure of the CPU 12 and the operating system or control program 18 loaded therein. A portion of the CPU 12 is divided into user spaces 50, which may be accessed by one or more human users 10, 10a. A portion of a user space 50 may contain a computer program 14, which is operated under user control or a computer program 16 that is run automatically with no user intervention. The operating system 18 consists of many modules for operation of the entire computer system. In particular, command processor modules 52 can receive commands from the computer programs 14 and 16. The command processor modules 52 are connected to user services modules 54. The user services modules 54 can also receive data directly from the computer programs 14 and 16. The user services modules 54 are connected to a virtual I/O request processor 55 which, in turn, is connected to a virtual to real channel command word (CCW) mapping module 56.

The command processor modules 52 are used to validate command requests. Both security authorization and syntax are checked in the course of such validation operations. If validated, the command processor modules 52 then request the user services modules 54 to initiate the command that has been requested. The user services modules 54, under direction of the command processor modules 52, initiate the request for the services to the rest of the system.

The virtual to real CCW mapping module 56 maps virtual addresses obtained from the programs 14 and 16 into real memory allocations. For discussion of virtual and real storage, see the IBM "370 Principles of Operation" manual. Virtual to real mapping is fully described in the aforementioned VM/System Product program documents.

Also connected to the user services module 54 is an I/O queue manager 58. The I/O queue manager 58 places an I/O request on a queue of one or more I/O requests and forwards this information to an I/O scheduler 60. The I/O scheduler 60, in turn, communicates with a channel 20 for initiating an I/O request and schedules the I/O operation for execution onto the channel 20. The I/O scheduler 60 is, in fact, connected to one or more channels 20.

Interrupt handlers 62 receive data from the channels 20. The interrupt handlers 62 use the data from the channels 20 to determine the status of the previously performed operations. Connected to the interrupt handler 62 is a dispatcher 64. The dispatcher 64 searches the queue of scheduled operations to determine which function is to be performed next. In conjunction with the dispatcher 64 is a scheduler 66 which receives input both from the dispatcher 64 and directly from the interrupt handler 62. The dispatcher 64 transfers control both to the user services module 54 and to the user space 50. The distinction between the scheduler 66 and the I/O scheduler 60 is that the scheduler 66 handles user and system services, such as command processors and virtual I/O request processes. The I/O scheduler 60 handles I/O operations only.

All of the components in the control program 18 are able to communicate with one another by means of data areas known as control blocks, shown generally at reference numeral 68. It should therefore be understood that the control blocks 68 are operatively connected to each component 52-66, although FIG. 2 does not include such connections in the interest of diagrammatical simplicity.

Figure 3:
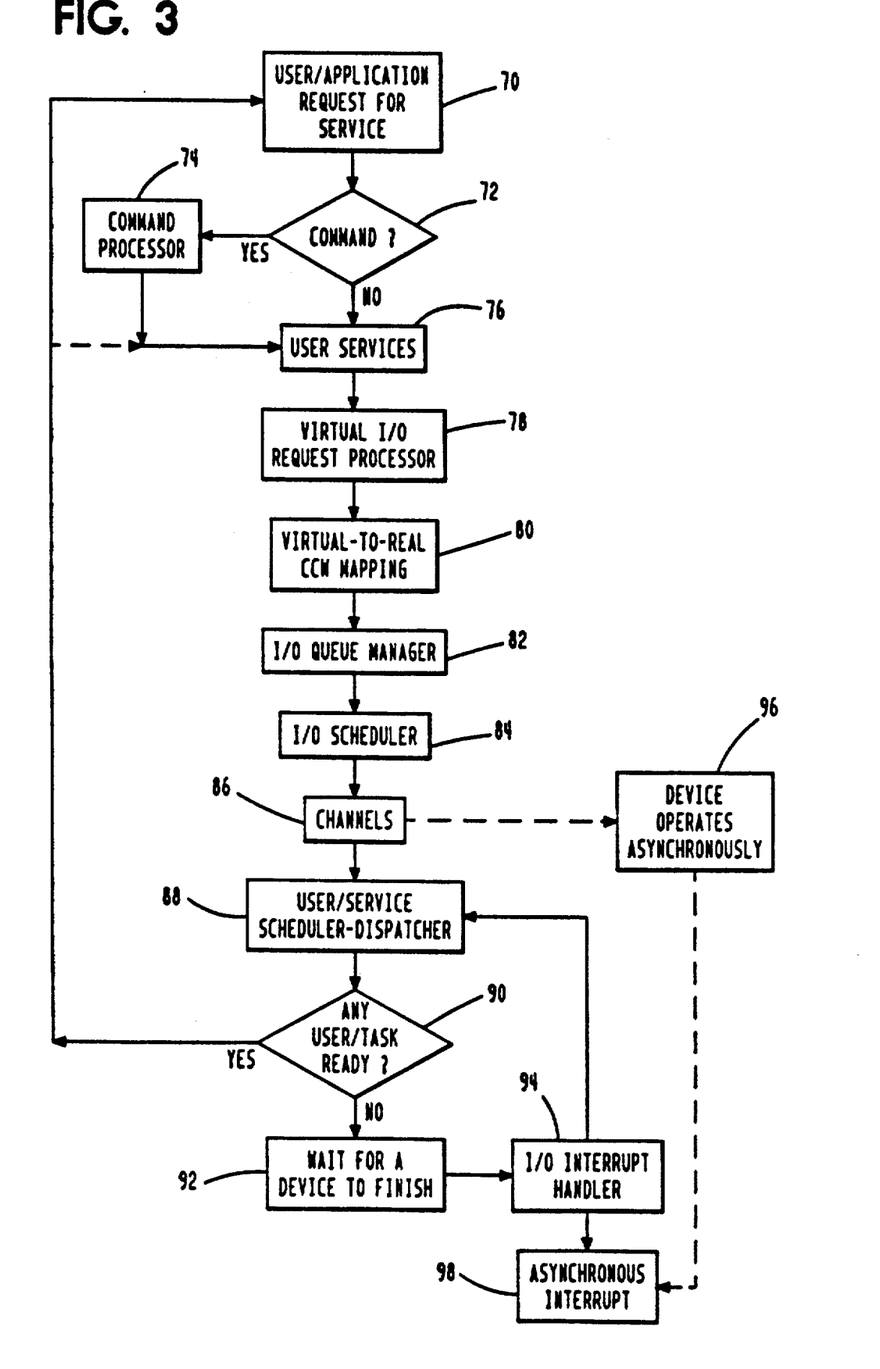
FIG. 3 is a flow chart showing the relationship of components identified in FIG. 2.

Referring now also to FIG. 3, which is best understood in connection with FIG. 2, there is shown a flow chart that depicts the operations of control program components.

A request for service, step 70, is made either by a user 10 (FIG. 2) or under control of a program application 16. The request may take the form of instructions or commands, step 72. If the request is in the form of a command, the command processor modules 52 receive control, step 74, and translate the command into a user service format. This translated command is then transferred from the command processor modules 52 to the user services modules 54, step 76. If the request for service generated by the user or the application, step 70, were an instruction, rather than a command, the user services modules 54 receive that instruction directly, step 76. The user services modules 54 process virtual I/O requests and transfer control to the virtual I/O request processor 55, step 78.

The virtual I/O request processor 55 requests the virtual to real CCW mapping module 56 to map the data from virtual to real addresses, step 80. The request is then passed to the I/O queue manager 58, step 82. The I/O scheduler 60 then receives control from the I/O queue manager 58, step 84. The I/O scheduler 60 then removes an element from the queue and transfers it to the channels 20, step 86.

Devices connected to the CPU 12 (FIG. 1) operate asynchronously with respect to CPU execution of instructions. Therefore, when a data transfer from the channels 20 occurs, the devices that are connected to the CPU 12 operate independently. Control is transferred from the channels 20 to the scheduler 66 and dispatcher 64, step 88.

The dispatcher 64 transfers control to any available user on the system, step 90. Not only may a user be ready to receive control, but a service, such as found in user services modules 54, may also be ready and capable of receiving control. When ready to receive control, a user can initiate a new request for service, step 70. If, however, no user or service is ready to receive control, the system must wait for a device to complete its operation, step 92. A signal to that effect is transferred to the interrupt handler 62, step 94. The interrupt handler 62 again transfers control to the scheduler 66 and dispatcher 64, step 88. Eventually a user will become ready to receive control, step 90, and the process from step 70 can be repeated.

As previously mentioned, the channels 20 transfer control to devices, step 96, shown with phantom lines in FIG. 3. The devices operate asynchronously and, when their operations have been completed, generate an asynchronous interrupt message, step 98. The asynchronous interrupt message is sent to the CPU 12 which transfers this control to the interrupt handler 62, step 94. Thus, the loop that starts with step 88 in the scheduler 66 and dispatcher 64 is completed.

Figure 4A:
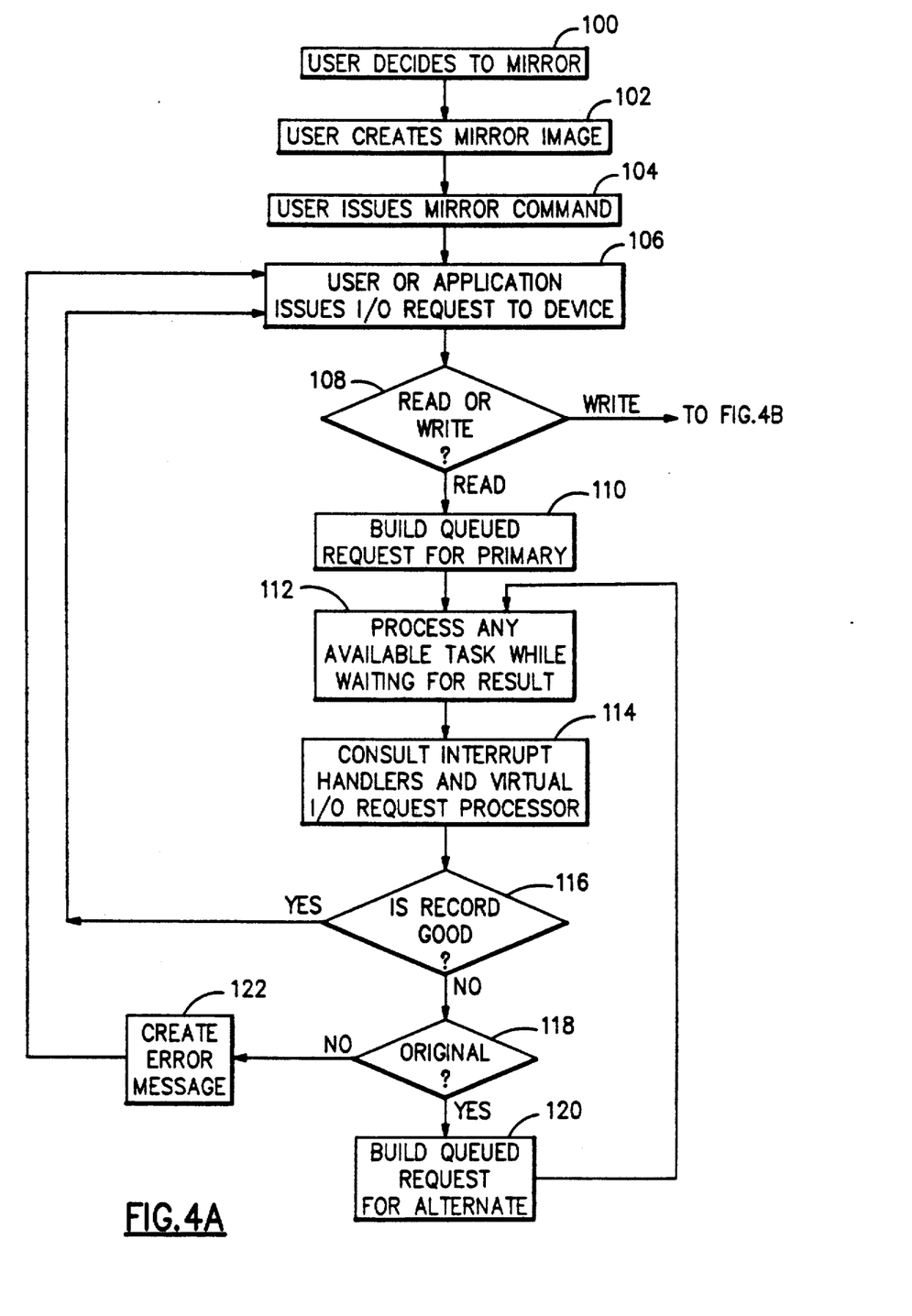
Figure 4B:
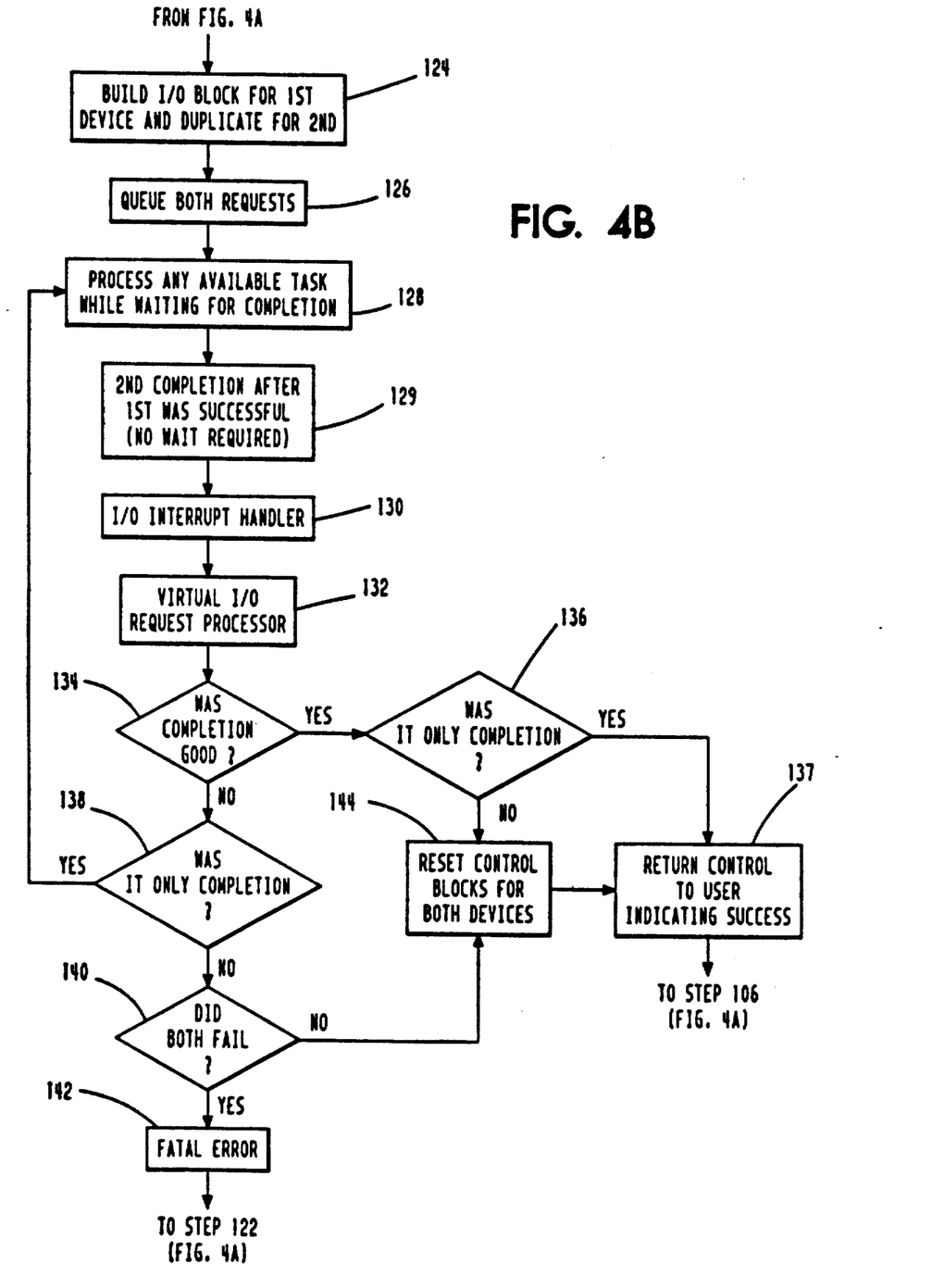

Referring now also to FIG. 4, a user or application determines that an operation requires mirrored support, step 100. At this point the user or application creates a mirrored image of the virtual device, step 102, an embodiment of which is the VM/370 CMS command DDR, as described in IBM publication, "Virtual Machine/System Product CMS Command and Macro Reference".

The user then issues the MIRROR command which actually initiates the start of mirroring, step 104. The use and construction of this DDR command are required only to indicate to the operating system 18 that a set of logical devices is participating in a mirroring operation. The DDR command may or may not be part of the operating system 18 at the discretion of the implementor. The user or his application issues I/O requests to a device, step 106.

Data Input (Read Operations)

If the request is for a read operation, step 108, the user services module 54 receives control and builds an I/O block request, step 110. The I/O block is then placed on the queue by the queue manager 58. The system may then proceed with other operations which are ready for control while it is waiting for this operation to complete step 112. During the wait operation, step 112, the system scheduler 66 may have placed requests for either user execution or other system services on the queue. The dispatcher 64 will then search this queue for an operation to perform. If such an operation is available for execution, the dispatcher 64 transfers control either to the user services module 54, to a user space 50 or to a user program 14 or 16.

When the device completes its execution, an asynchronous interrupt is generated and received by interrupt handlers 62, step 114. The interrupt handlers 62 then transfer control to the virtual I/O request processor 55, step 114, which determines whether the request was good, step 116. A status of good means that the I/O request has terminated successfully, no errors having occurred. If the request is good, step 116, control is transferred to the scheduler 66 and dispatcher 64 to repeat the process of scheduling user action or system service action, step 106 and the requestor is notified of the successful data transfer.

In the event that the I/O request generates a status indicating a failure, step 116, the virtual I/O request processor 55, determines whether the request that failed was for the first device of the mirrored group or for the alternate device, step 118. If the request was for the original device, the virtual I/O request processor 55 builds a request for the alternate device, step 120, and the process repeats from step 112. If the failure was for the mirror device, however, step 118, then control is passed to an error message processing routine, step 122, which generates and displays a message for the user indicating that the mirroring operation has failed. The mirroring operation is terminated and a return code is passed back to the user and/or the user's application indicating that the operation has failed, step 106.

Data Output (Write Operations)

In the event that the initial request for I/O is for a write operation (i.e., data is to be transferred from the system or CPU to external storage), step 108, the virtual I/O request processor 55 builds an I/O request block for the primary logical device and a duplicate I/O request block for the mirror device, step 124. The virtual I/O request processor 55 then transfers control to the I/O queue manager 58, which places both requests on the queue for service and scheduling via the I/O scheduler 60, step 126. The system now transfers control to the dispatcher 64, which determines whether there is any action to be taken in the system. If no user is ready to receive control, the system enters a state awaiting completion of action by the device, step 128. Any other available task can be performed during this waiting period. While the system is waiting or a user is executing instructions or a user service is executing, the second completion will occur, step 129.

When a device completes execution, an interrupt message is transmitted to the interrupt handlers 62, step 130. The interrupt handlers 62 determine, by means of the dispatcher 64, that the virtual I/O request processor 55 is to receive control, step 132.

The virtual I/O request processor 55 then determines whether the I/O request was successful, step 134. At this point (i.e., after data has been received that is deemed to be usable) a verification routine could be implemented. The verification routine reads data from the hardware media to verify that, although the real device #1 indicated the data was correctly written, it is in fact resident on the media in error free form. The verification routine, if implemented, ensures only that the data was properly transcribed at the time of execution, not that no errors will occur in the future. The concept of mirroring at-the-time-of-execution has value in that operations will be unaffected by single points of failure in the future.

If the I/O request was successful, the virtual I/O request processor 55 determines whether the completion was the only completion for the mirrored device, step 136. If so, control is then returned to the user, step 137, indicating successful completion and program execution continues from step 106.

If the virtual I/O request processor 55 determines that this was not the only device completion for the mirrored devices, step 138, the processor 55 determines whether both requests failed, step 140. A failed request indicates that data is unusable from the device that completed unsuccessfully. If both requests did in fact fail, this is considered a fatal error for the device, step 142, and control is transferred to step 122 to generate an error message and status return code to the user or user application.

If, however, it is determined that both devices did not fail (i.e., one device completed successfully and one device completed unsuccessfully), step 140, the virtual I/O request processor 55 sets the control blocks 68 for both devices, step 144, and returns control to the user, indicating success, step 137. Program execution can then continue from step 106.

In the event that a second device completion occurs successfully, step 134, and it is not the only completion, step 136, regardless of whether the first completion was successful, the control blocks 68 are reset for both devices, step 144. Control is returned to the user indicating success, step 137. Program execution can then continue from step 106.

It should be understood that, while the description hereinabove provided refers to three real devices, any combination of one or more physical devices can be adapted to perform in accordance with this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A method performed by a computer operating system for controlling a computer system, said computer system comprising a central processing unit in which said operating system is installed, one or more direct access peripheral devices, at least one device controller connected to and controlling said direct access peripheral devices, said device controller being connected to a channel of said central processing unit and responsive to said operating system, said operating system including a virtual input/output request processor connected to a virtual-to-real channel word mapping module, said mapping module mapping virtual addresses to real addresses of said direct access peripheral devices in response to a request from said virtual input/output request processor, said operating system incorporating an optional user invoked mirror command, said mirror command specifying a virtual address of a primary logical device and a virtual address of a mirror logical device to write data to said virtual addresses, said mirror command optionally being invoked or turned off during a computer session by a user, the method performed by said operating system comprising the steps of:

building duplicate request input/output data blocks for said primary logical device and said mirror logical device when said mirror command is invoked;

transferring control to said virtual input/output request processor of said operating system, said virtual input/output request processor accessing said virtual-to-real channel word mapping module of said operating system to map the virtual addresses of said primary logical device and said mirror logical device to respective real addresses on one or more of said direct access peripheral devices;

said device controller executing a write request from said virtual input/output request processor of said operating system to write said data blocks for said primary logical device and said mirror logical device to said respective real addresses on one or more of said direct access peripheral devices, said data blocks being composed of a plurality of records, said operating system controlling said device controller to write a record from the data block for said primary logical device, then to write a record from the data block for said mirror logical device, until all records from both said data blocks have been written thereby performing a substantially simultaneous write operation for both said data blocks;

verifying by said virtual input/output request processor of said operating system that said data blocks have been correctly written to said respective real addresses of said primary logical device and said mirror logical device; and said operating system returning control to said user upon verification that said data blocks have been correctly written to said respective real addresses on said one or more of said direct access peripheral devices.

2. The method performed by said computer operating system as recited in claim 1 wherein at least one of said direct access peripheral devices is a direct access storage device.

3. The method performed by said computer operating system as recited in claim 2 wherein said direct access storage device is a magnetic disk drive.

4. The method performed by said computer operating system as recited in claim 2 wherein said direct access storage device is a magnetic tape drive.

5. The method performed by said computer operating system as recited in claim 2 wherein said direct access storage device is a printer.

6. The method performed by said computer operating system as recited in claim 2 wherein said direct access storage device is a computer terminal.

7. The method performed by said computer operating system as recited in claim 2 wherein said direct access storage device is a magnetic memory.

8. The method performed by said computer operating system as recited in claim 2 wherein said direct access storage device is an optical memory.

9. The method performed by said computer operating system as recited in claim 1 wherein said real addresses of said primary logical device and said mirror logical device are on separate physical devices.

10. The method performed by said computer operating system as recited in claim 1 wherein said real addresses of said primary logical device and said mirror-logical device are on a common physical device.

11. The method performed by said computer operating system as recited in claim 1 wherein said user invoked mirror command optionally allows the user to specify virtual addresses of a plurality of mirror logical devices.

12. The method performed by said computer operating system as recited in claim 1 further comprising the steps of:

building a queued request to read data from said primary logical device and, when said mirror command is activated, to read data from said mirror logical device;

transferring control to said virtual input/output request processor of said operating system, said virtual input/output request processor accessing said virtual-to-real channel word mapping module of said operating system to map the virtual addresses of said primary logical device to said real address;

said device controller executing a read request under control of said operating system to read a data block from said primary logical device at said real address of one of said direct access peripheral devices, said device controller verifying to said operating system that said read request has been executed correctly; and said operating system returning control to said user upon verification that said read request has been executed correctly;

but if said read request has not been executed correctly, then said operating system building a queued request to read data from said mirror logical device and transferring control to said virtual input/output request processor of said operating system, said virtual input/output request processor accessing said virtual-to-real channel word mapping module of said operating system to map the virtual address of said mirror logical device to said real address; and said device controller executing a read request under control of said operating system to read a data block from said mirror logical device at said real address of one of said direct access peripheral devices.

13. A computer system comprising a central processing unit in which an operating system is installed, one or more direct access peripheral devices, at least one device controller connected to and controlling said direct access peripheral devices, said device controller being connected to a channel of said central processing unit and responsive to said operating system, said operating system including a virtual input/output request processor connected to a virtual-to-real channel word mapping module, said mapping module mapping virtual addresses to real addresses of said direct access peripheral devices in response to a request from said virtual input/output request processor, said computer system further comprising:

means responsive to a user invoked mirror command for registering a virtual address of a primary logical device and a virtual address of a mirror logical device to write data to said virtual addresses, said mirror command optionally being invoked or turned off during a computer session by a user;

means for building duplicate request input/output data blocks for said primary logical device and said mirror logical device when said mirror command is invoked;

means responsive to said building means for transferring control to said virtual input/output request processor, said virtual input/output request processor accessing said virtual-to-real channel word mapping module to map the virtual addresses of said primary logical device and said mirror logical device to respective real addresses on one or more of said direct access peripheral devices, said device controller executing a write request from said virtual input/output request processor to write said data blocks for said primary logical device and said mirror logical device to said respective real addresses on one or more of said direct access peripheral devices, wherein said data blocks are composed of a plurality of records and said device controller writes a record from the data block for said primary logical device, then writes a record from the data block for said mirror logical device, until all records from both said data blocks have been written thereby performing a substantially simultaneous write operation for both said data blocks, said virtual input/output processor verifying that said data blocks have been correctly written to said respective real addresses of said primary logical device and said mirror logical device; and means responsive to said virtual input/output processor for returning control to said user upon verification that said data blocks have been correctly written to said respective real addresses on said one or more of said direct access peripheral devices.

14. The computer system as recited in claim 13 further comprising means for building a queued request to read data from said primary logical device and, when said mirror command is activated, to read data from said mirror logical device, said transferring means transferring control to said virtual input/output request processor, said virtual input/output processor accessing said virtual-to-real channel word mapping module to map the virtual address of said primary logical device to said real address, said device controller executing a read request to read a data block from said primary logical device at said real address of one of said direct access peripheral devices, said device controller verifying that said read request has been executed correctly and returning control to said user upon verification that said read request has been executed correctly, but if said read request has not been executed correctly, then said building means building a queued request to read data from said mirror logical device and transferring control to said virtual input/output request processor, said virtual input/output processor accessing said virtual-to-read channel word mapping module to map the virtual address of said mirror logical device to said real address, and said device controller executing a read request to read a data block from said mirror logical device at said real address of one of said direct access peripheral devices.

* * * * *

UNITED STATES PATENT AND TRADEMARK OFFICE
CERTIFICATE OF CORRECTION

PATENT NO. : 5,072,368

DATED : Dec. 10, 1991

INVENTOR(S) : Dennis J. Foreman & Lawrence E. Larson

It is certified that error appears in the above-identified patent and that said Letters Patent is hereby corrected as shown below:

On the title page:
Column 1, before "Inventors:" change "[76] to --[75] --.

Column 1, after "Inventors:" and before "Appl. NO.:" insert the following entry --[73] Assignee: International Business Machines Corporation--.

Column 2, before item [57] Attorney, Agent, or Firm should read

--Whitham & Marhoefer --.

Signed and Sealed this

Twenty-second Day of June, 1993

Attest:

MICHAEL K. KIRK

Attesting Officer

Acting Commissioner of Patents and Trademarks